Patented Nov. 14, 1944

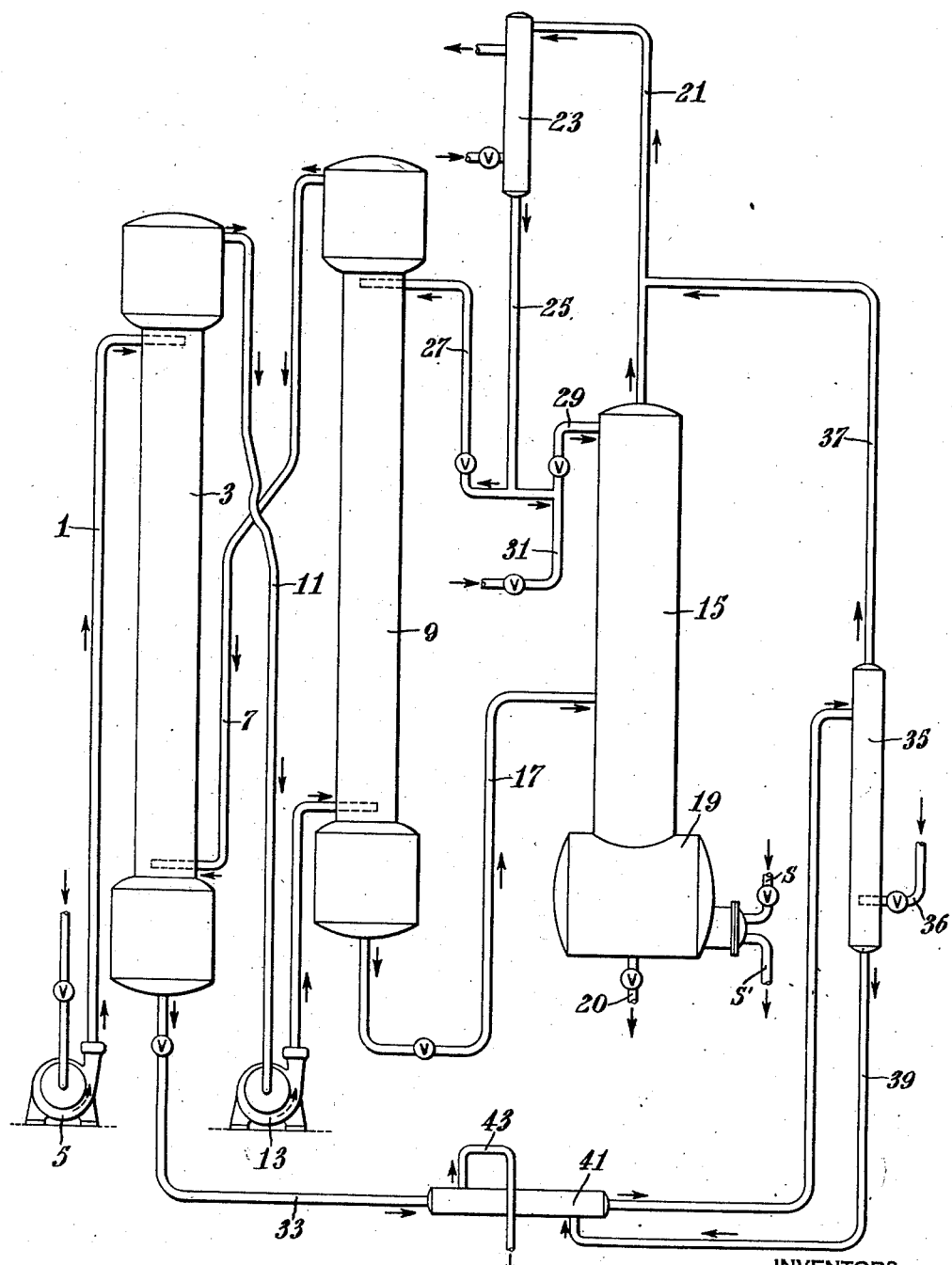

2,362,579

UNITED STATES PATENT OFFICE 2,362,579

PROCESS FOR RECOVERING ORGANIC COMPOUNDS

Irvin L. Murray and Radcliffe G. Edmonds, Charleston, W. Va., assignors to Carbide and Carbon Chemicals Corporation, a corporation of New York Application July 18, 1941, Serial No. 402,962

11 Claims. (Cl. 260—583)

This invention relates to the recovery of organic compounds from aqueous solutions containing such compounds together with inorganic materials; and more especially it concerns the recovery of water-soluble organic compounds in concentrated or relatively pure form from aqueous reaction mixtures containing the same. The invention has especial utility for the recovery in purified form of mixtures of the ethylene amines, such as ethylene diamine, diethylene triamine, triethylene tetramine, and higher polyethylene amines, from aqueous solutions thereof containing water-soluble inorganic compounds.

In the recovery of certain organic materials from aqueous solutions thereof it is occasionally advantageous to effect separation of the former from the water by countercurrent liquid extraction with a water-immiscible solvent, in instances where distillation of the solution is impracticable or impossible. Thus, in the separation of high-boiling organic materials from an aqueous solution approximately saturated with an inorganic salt, such as sodium chloride, it is usually very difficult to obtain efficient recovery of the organic material from the slurry formed by evaporation of the water.

In practice, several difficulties are encountered in the recovery of organic materials from aqueous salt solutions by extraction, followed by distillation of the solvent. One difficulty results from the fact that the near saturation of the extract with the inorganic salt prevents the normal recovery of the solvent by distillation, since the salt deposits in the still column and on the coils of the heating elements; and frequently considerable foaming of the solution occurs. A second difficulty often results from the necessity of using a proportionately large volume of solvent for efficient extraction, because of the relatively unfavorable distribution coefficients of the organic material between water-immiscible solvents and certain aqueous solutions. This apparently is due to the fact that the molecular structure of organic materials soluble in a saturated salt solution causes them to have (1) a great affinity for water, and (2) a relatively small affinity for water-immiscible solvents.

To prevent deposition of salt in the solvent recovery still, attempts have been made to add water to the column, removing the solvent as a constant boiling mixture with water, and recovering the organic material in a concentrated aqueous solution containing a small amount of salt. This procedure is subject to the objection that excessive quantities of steam are required, because of the large volumes of solvent handled and of the water vaporized to form therewith a constant boiling mixture in the solvent recovery still. Since the solvent is distilled for its recovery, it is necessary to select a solvent having not only the requisite solvent properties but also one having a suitable boiling point, a capacity for forming a constant boiling mixture with water, one readily separable by distillation from the organic material, and having a suitable latent heat of vaporization.

The present invention is based in important part upon the observation that a water-immiscible or but partially miscible solvent will extract a water-soluble organic compound from an aqueous solution containing the same together with an inorganic salt more readily than it will extract the same organic compound from an aqueous solution containing a lesser amount of the salt.

Among the more important objects of the invention are: To provide in novel manner for recovering an organic material from an aqueous solution containing an inorganic salt; and to provide a novel procedure for extracting organic material from an aqueous solution under conditions whereby the presence of the inorganic salt does not interfere with the efficiency of the extraction and recovery steps of the process.

In accordance with the present invention an aqueous mixture containing the organic compound or compounds to be recovered and purified, such as a mixture of the ethylene amines, and an inorganic salt such as sodium chloride, is passed through an extraction column of well-known type in countercurrent contact with a flowing stream of a water-immiscible or but partially miscible solvent, such as those hereinafter named. The extract containing the said solvent and the dissolved organic compound is then withdrawn from the extraction column and is passed through a second extraction or washing column in intimate countercurrent contact with a flowing stream of water, or of water more or less saturated with the aforesaid solvent. The water preferably is substantially free from dissolved inorganic salts. However it may contain a small amount of inorganic salts, essentially less than is present in the aqueous mixture being extracted, where lower extraction efficiencies are satisfactory. In extracting ethylene amines from aqueous solutions, using isobutanol, as hereinafter described, the water fed to the water washing column should not contain more than around 5% as much inorganic salts as is present in the aqueous solution fed to the first column. In the washing column the residual small amount of inorganic salt and substantially all of the organic compound are removed from the solvent, after which the solvent is recycled directly to the first extraction column. Since the water solution of the organic compound is far from saturated with respect to the inorganic salt, the solution may be concentrated to the same composition as that obtainable in a solvent recovery still where water is fed to the still column. This permits recovery of the organic compound in substantially pure form. The raffinate from the first extraction column may be treated to remove any solvent therein; and the latter, together with vapors from the solvent recovery still, may be condensed, and the condensate, which is essentially solvent-saturated water, used to extract organic material in the second extraction step conducted in the washing column.

The respective extractions generally are conducted at temperatures around 20° to 30° C., although higher and lower temperatures may be used. Often the extraction may be more efficient when conducted at temperatures between 30° and 65° C.

Referring to the accompanying drawing wherein is illustrated diagrammatically one form of apparatus adapted for the practice of the invention, an aqueous solution containing an organic compound to be isolated and recovered is fed through conduit 1 to the extracting column 3 by means of pump 5. For introducing a stream of a suitable solvent into extracting column 3, a conduit 7 connects the lower portion of the aforesaid column with the upper end of a second extracting column or washing column 9, which preferably is elevated to permit gravity flow of solvent to column 3. The upper end of column 3 is connected with the lower portion of the column 9 by a conduit 11 having therein a pump 13. A stripping still 15, for vaporizing and removing solvent and water from the solution of organic compound formed as the extract in the washing column 9, is connected with the bottom of the latter through conduit 17. The latter is connected with the proper feed plate or zone in the midportion of the still column. The kettle 19 of this still is provided with suitable heating means such as steam and condensate lines S, S'; and with means including valve-controlled conduit 20 for withdrawing the crude product, and/or for conducting it to the usual refining still (not shown). The upper end of still 15 is connected by line 21 with condenser 23 having the usual inlet and outlet for a cooling fluid. The outlet line 25 from the condenser is in communication, respectively, with the upper end of the wash column 9 and with the upper end of the recovery still through the respective valve-controlled conduits 27 and 29. A valve-controlled conduit 31 is connected respectively with conduits 27 and 29, and serves for supplying additional fresh water to the system, as required to replace water losses through conduit 43.

For recovering from the raffinate formed in column 3 any solvent present therein, a raffinate discharge conduit 33 connects the lower end of column 3 with the upper portion of the column of a raffinate still 35. The latter is heated in suitable manner, as by low pressure steam from line 36. The vapors leave the still 35 through conduit 37 and are mixed with the vapors flowing through conduit 21 from the recovery still 15. The exhausted raffinate flows from the still 35 through conduit 39 and passes through a heat-exchanger 41 in indirect contact with the raffinate flowing to still 35, and thence is conducted through conduit 43 to a point of storage or of recovery of any valuable inorganic salts present therein, or to waste.

In a preferred operation of the process, the aqueous solution containing the organic compound to be separated and recovered is pumped through line 1 into the upper end of extraction column 3 where it passes downward in intimate contact with an upwardly-flowing stream of a water-immiscible solvent for the organic compound. The solvent enters the column near its base through line 7. The resultant solvent extract overflows from the upper end of column 3 and is pumped through line 11 to the second column 9. The raffinate, which consists of a salt water solution stripped of substantially all of the organic compound, but which may contain small amounts of the solvent, is withdrawn from column 3 through line 33.

In column 9 the solvent and extract pumped thereto from column 3 flows upwardly in intimate countercurrent contact with a flowing stream of water, which commonly is saturated with the solvent, and which is introduced into the upper end of the column 9 through conduit 27. This water or aqueous solution may be formed from the vapors leaving still 15 and condensed in condenser 23, together with additional water entering the system from line 31. The water-saturated, water-immiscible solvent flowing upwardly in the column 9 is withdrawn from the upper end thereof at a point above the separating head associated with conduit 27, and is returned through conduit 7 to the extracting column 3.

The aqueous solution containing the organic compound extracted or washed from the solvent in column 9 is withdrawn from the base of that column continuously, and is conducted through line 17 to the column of the recovery still where it is concentrated by the removal of at least portions of the water and also of any solvent still present therein. The water vapors and some solvent vapors leave still 15 through line 21, are condensed, and thence are conducted to the upper end of the washing column 9 for reuse. The crude product from still 15, consisting principally of a concentrated aqueous solution of the organic compound, is withdrawn from the still through line 20 to storage, or to a refining still where it can be further refined and various components separated if desired. The raffinate from column 3 is stripped of any solvent therein by means of still 35; and the stripped solvent and water vapors are condensed in condenser 23 and are recirculated through column 9, still 15 and associated parts.

The following will serve to exemplify the practice of one form of the invention in connection with the recovery of a mixture of ethylene amines from an aqueous reaction mixture containing the same, together with a dissolved inorganic salt, utilizing isobutanol as the solvent.

An aqueous reaction mixture containing around 10% of ethylene amines and 20% of sodium chloride was passed through an extraction column similar to column 3 of the accompanying drawing, in intimate countercurrent contact with a flowing stream of isobutanol which was saturated with water. The solvent and the mixture being extracted entered the column in the ratio by volume around 7.8:1. The extract leaving the column contained around 2% of amines, calculated as ethylene diamine, and 0.1% of sodium chloride; the balance being isobutanol and water. Thus the sodium chloride-to-ethylene amines ratio had been reduced from 2:1 in the original reaction mixture to 0.05:1 in the isobutanol extract leaving the column; and the salt was present in very small concentrations in the extract entering the second extraction or washing column 9. Around 95% of the ethylene amines present in the reaction mixture was extracted.

The raffinate withdrawn from column 3 contained around 5% of isobutanol; the balance being an aqueous solution of sodium chloride containing a minute amount of amines. The raffinate may be stripped continuously of isobutanol in the still 35, which may be heated with low-pressure direct steam under conditions maintaining a side-column temperature somewhat above 98° C. The vapors from this still may be mixed with the vapors leaving the recovery still 15, as hereinbefore pointed out.

The isobutanol extract from column 3 was passed through a second extraction column or scrubber, similar to column 9 of the drawing, in intimate countercurrent contact with a flowing stream of isobutanol-saturated water, in the ratio by volume of about 0.4 of the latter to 1 of the isobutanol extract.

The aqueous extract leaving the second column 9 through line 17 contained around 5% of ethylene amines, calculated as ethylene diamine, and about 0.2% of sodium chloride, the remainder being water containing some isobutanol. About 99% of the ethylene amines present in the extract from column 3 was recovered in this aqueous extract.

The isobutanol leaving the upper end of extraction column 9 through conduit 7 contained 0.005% of amines and was saturated with water. As hereinbefore indicated, this recovered solvent may be recycled directly to the first extraction column to serve for extracting amines from a fresh quantity of the reaction mixture fed to that column through line 1. The isobutanol present in the extract from the second extraction column 9, and a selected portion of the water present therein, may be vaporized continuously in still 15, and the vapors condensed and returned to column 9.

The amines were recovered from still 15 as a concentrated aqueous solution containing around 50% of water and a small amount of sodium chloride. The amines are readily recovered by the usual fractional distillation of this aqueous solution, the sodium chloride content thereof being so small as not to interfere with the distillation, or with the recovery of the amines in substantially pure form.

The use of fresh water free from or low in water-soluble compounds as an extractant in the second extraction column 9 results in the maximum concentration of ethylene amines in the extract flowing through line 17 to the recovery still 15.

While the invention has been exemplified in connection with a process involving the use of isobutanol as the solvent, it will be understood that the invention is in no sense limited to the use of that solvent. Thus, among a wide variety of other water-immiscible or partially miscible solvents suitable for use in the process may be mentioned ethers, such as diethyl ether, diisopropyl ether, and the monobenzyl ether of ethylene glycol; aromatic amines, such as aniline; aromatic hydrocarbons, such as benzene, toluene, and the xylenes; and saturated aliphatic hydrocarbons, particularly those containing between six and eleven carbon atoms, such as hexane. The saturated, at least partially water-immiscible, monohydric aliphatic alcohols having from four to eight carbon atoms in the molecule are particularly useful as solvents in the process. The various butanols other than tertiary butanol—and especially isobutanol—are outstandingly effective.

It is of great practical importance that the specifications for a solvent suitable for use in the present process are much less difficult to meet than for the solvents required for prior extraction processes wherein the choice of solvent may be very limited. Thus, the principal requirement for a solvent to be used in the usual extraction process, a favorable distribution coefficient, is of relatively minor importance in the present process, since the large volume of solvent, which is required when using a solvent having a poor distribution coefficient, does not have to be vaporized or distilled. The size of the recovery still, and the heat requirements, are determined in general by the concentration of the organic compound in the salt-containing aqueous reaction mixture, and not by the solvent selected.

For the same reason, the boiling point of the solvent used in this process, the composition of its constant boiling mixture with water, the difficulty of its distillation from the dry organic material, and its latent heat of vaporization, are of little interest. Consequently, solvents quite unsuitable for use in the usual extraction processes may effectively be used in the present process. This much wider choice of solvent permits economies hitherto denied to designers of extraction plants.

The only requirements for a solvent suitable for use in the process are that it should be chemically inert, respectively, to the organic compound being recovered, to water, and to the salt solution being treated; it should have a relatively low solubility for water in order to prevent undue dilution of the salt water in column 3 with water from column 9 and, preferably, should be substantially immiscible therewith; it should not dissolve an appreciable amount of the inorganic salt; it should have a specific gravity different from both the aqueous reaction mixture being processed and the aqueous solution used as extractant in the second column, in order to facilitate its separation from these liquids; and it must dissolve substantial amounts of the organic compound to be separated and recovered, although the degree of this solubility is not of ruling importance.

An important advantage of the present invention results from the fact that the overall efficiency of the separation of the organic compound is practically independent of the distribution coefficient relation between water and the solvent employed. Thus, if the organic compound which is to be separated is very soluble in water, the distribution coefficient of the solvent may be quite low, so that large volumes of solvent may be necessary to extract the organic compound in commercially practicable amounts. It will be readily apparent that, if an attempt was made to recover the dissolved organic compound from such a dilute extract by distillation under conditions wherein the solvent is distilled from the extract, leaving the pure compound as a still residue, in accordance with common practice prior to this invention, the excessive heat requirements, and the large-capacity distillation apparatus and condensers needed, would greatly increase the cost of recovery of the compound, and would render such procedure commercially unattractive.

The present invention is applicable in instances where the organic compound to be recovered cannot be separated from the solvent as a distillate, as, for example, where the organic compound has a higher boiling point than the solvent, or where the compound decomposes at the temperature required to remove it as a distillate from the particular solvent employed.

The invention may conveniently be used in combination with the usual solvent extraction processes for recovering a water-soluble organic compound wherein the solvent is separated from the organic compound by distillation, but where appreciable amounts of salt dissolve in the solvent and complicate later purification. Such purification difficulties have been readily avoided by subjecting the extract from such extraction process to the water or aqueous treatment of this invention, and then recovering the organic compound from the resultant aqueous solution.

Where the distribution coefficients for the two columns differ, it is possible to secure substantially the same concentration of the organic compound in the aqueous solution flowing to the recovery still as was originally present in the reaction mixture, by regulating the amount of water fed to column 9 and the amount of organic compound fed to the extraction column 3, independently of the volume of solvent necessary to extract that amount of the organic compound from the salt-containing reaction mixture. In this manner the inorganic salt may be utilized indirectly to increase the concentration of the organic compound in the extract being fed to the recovery still through line 17.

The extraction columns 3 and 9 may be packed with contact material such as Raschig rings or similar material; or, alternatively, may be of the baffle-plate type of extraction apparatus, or the equivalent. Various engineering refinements well known to the art may be used in conducting and automatically controlling the present two-stage extraction, for increasing the efficiency of the extraction of any selected aqueous solution containing a water-soluble organic compound and an inorganic salt being processed.

The present process effectively separates water-soluble organic compounds from solutions thereof containing inorganic compounds under conditions which avoid such objectionable features of prior processes as the deposition of salt in concentration and recovery stills, and foaming within such stills; and the requirement of large volumes of steam in instances where a high ratio of solvent to the solution being extracted is necessitated because of an unfavorable distribution coefficient.

The term "distribution coefficient," as used herein, refers to the proportion of the organic compound being recovered which is dissolved in the respective water layer and solvent layer of a stratified mixture of equal volumes of water and of the said solvent. The term designates the ratio of the number of pounds of the organic compound in 100 pounds of the water layer to the number of pounds of the organic compound in 100 pounds of the solvent layer, at any selected temperature.

The term "ethylene amine" is used in the claims to designate ethylene diamine, diethylene triamine, triethylene tetramine, and the higher polyethylene amines, as well as mixtures of two or more of such amines.

We claim:

1. Process for the recovery of a mixture of ethylene amines from an aqueous solution thereof containing at least one dissolved inorganic salt, which comprises extracting said aqueous solution with an organic solvent for said amines which is inert to said amines and salt, and is at least partially immiscible with water and in which said inorganic salt is only slightly soluble, separating the resultant solvent extract containing said amines from the residual raffinate, further extracting the separated solvent extract with water, thereby forming a second aqueous solution of said amines, and separating the last-named aqueous solution of amines from the residual inorganic salt.

2. In the process for the recovery of a mixture of ethylene amines from an aqueous solution thereof containing at least one inorganic salt, the steps which comprise extracting said solution with a saturated monohydric aliphatic alcohol which is at least partially immiscible with water, and has from four to eight carbon atoms in the molecule, separating from the residual raffinate the resultant alcoholic solution containing the ethylene amines, extracting said alcohol solution with water, thereby forming an aqueous solution of said amines, and separating such aqueous solution of amines from the residual alcohol.

3. Process for the extraction of a mixture of ethylene amines from an aqueous solution thereof containing at least one inorganic salt, which comprises extracting said solution with isobutanol, separating from the residual raffinate the isobutanol solution containing the ethylene amines, washing the isobutanol solution with water, thereby forming a second aqueous solution containing less inorganic salt per unit of said amines than is present in said first-named aqueous solution, and separating said second aqueous solution from the residual isobutanol.

4. Process for the recovery of an ethylene amine from an aqueous solution of such amine rich in at least one water-soluble inorganic salt, which comprises extracting said solution with an organic solvent for the amine, which solvent is at least partially immiscible with water and is inert to the amine and to said salt, separating the solvent solution containing the amine from the residual raffinate, extracting the solvent solution with water, thereby forming a second aqueous solution of said amine low in said salt, and separating from the residual organic solvent the last-named aqueous solution.

5. Process for recovering a substantially pure ethylene amine from an aqueous solution of such amine rich in a water-soluble inorganic compound, which comprises extracting said solution with a relatively large volume of an at least partially water-immiscible organic solvent for the amine in which the inorganic compound is relatively insoluble, and which solvent is inert to said amine and to said inorganic compound, washing the resultant dilute solvent solution of amine with a relatively small volume of water, thereby extracting the amine from said solvent solution and forming a second aqueous solution thereof that is richer in said amine than the solvent solution, isolating said second aqueous solution, removing water and organic solvent from the latter, and recovering substantially pure ethylene amine from the resultant concentrated solution.

6. Process for preparing a concentrated solution of an ethylene amine low in water-soluble inorganic salts from an aqueous solution thereof rich in said salts, which comprises extracting such an aqueous solution of an ethylene amine with an at least partially water-immiscible organic solvent for said amine in which said salt is less soluble than in water and which is inert to said amine and to said salt, isolating and washing the solvent solution of said amine with a small volume of water, thereby extracting said amine and forming a second aqueous amine solution containing less inorganic salt per unit of amine than said first-named aqueous solution, and isolating and concentrating said second aqueous solution of amine.

7. Process for preparing a substantially pure ethylene amine which comprises extracting an aqueous solution containing such amine and rich in a water-soluble inorganic compound with a saturated monohydric aliphatic alcohol which is at least partially immiscible with water and has from four to eight carbon atoms in the molecule, isolating the resultant solvent solution of amine and intermixing the same with a small volume of water, thereby extracting said amine from the solvent solution and forming a second aqueous solution that is richer in said amine than said solvent solution, and is poorer in said inorganic compound than the first-named aqueous solution, concentrating said second aqueous solution, distilling the concentrated solution, and separately recovering said amine.

8. Process for the recovery of an ethylene amine from an aqueous solution thereof containing at least one dissolved inorganic salt, which comprises extracting said aqueous solution with an organic solvent for said amine which is inert to the amine and to said salt, and which is at least partially immiscible with water, said solvent being selected from the group consisting of the saturated aliphatic hydrocarbons, the aromatic hydrocarbons, the ethers, and the saturated monohydric aliphatic alcohols having from four to eight carbon atoms in the molecule, separating the resultant solvent extract containing said amine from the residual raffinate, washing the solvent extract with water, thereby forming a second aqueous solution of said amine low in said inorganic salt, and separating the purified ethylene amine from said second aqueous solution containing the residual inorganic salt.

9. Process for preparing a concentrated solution of an ethylene amine low in water-soluble inorganic salts from aqueous solutions thereof rich in at least one of said salts, which comprises extracting such an aqueous solution of an ethylene amine with a saturated monohydric aliphatic alcohol which is at least partially water-immiscible, and in which said salt is less soluble than in water, said alcohol being inert to said amine and to said salt, isolating and washing the alcohol solution of said amine with a small volume of water, thereby extracting said amine and forming a second aqueous amine solution containing less inorganic salt per unit of amine than said first-named aqueous solution, isolating and concentrating said second aqueous solution of the amine, and extracting a further quantity of the first-named aqueous amine solution by means of the residual alcohol from the water extraction step.

10. Continuous process for purifying a crude ethylene amine, which comprises passing a flowing stream of an aqueous solution of such amine rich in sodium chloride in intimate countercurrent contact with a large volume of an organic solvent for the amine which is inert toward said amine and sodium chloride, and which is at least partially immiscible with water, continuously withdrawing the resultant solvent solution of amines from contact with said stream of solvent and passing the former in intimate countercurrent contact with a stream of water of small volume, thereby forming a second flowing aqueous solution of said amine having a lower sodium chloride to ethylene amine ratio than the first-named aqueous solution, continuously separating said second aqueous solution from the residual organic solvent, conducting the residual solvent into contact with another portion of the first-named aqueous solution, continuously distilling said second aqueous solution, and condensing the vapors of ethylene amine thus distilled.

11. Continuous process for preparing from an aqueous solution containing an ethylene amine and rich in sodium chloride a second aqueous solution of said amine containing little or no sodium chloride and suitable for concentration in a continuous still, which comprises continuously flowing a stream of an aqueous solution containing such amine and a large proportion of sodium chloride in countercurrent contact with a stream of larger volume of an at least partially water-immiscible organic solvent for said amine, which solvent is inert to the amine and to sodium chloride, and in which solvent sodium chloride is less soluble than in water, isolating the resultant solvent solution of the amine from the residual raffinate, passing the former in countercurrent contact with a stream of water of lesser volume than said solvent solution, thereby continuously extracting said amines from the solvent solution and forming a second aqueous solution richer in said amines than said solvent solution, and poorer in sodium chloride than the first-named aqueous solution, and continuously withdrawing the residual solvent and flowing it in contact with another portion of the first-named aqueous solution.

IRVIN L. MURRAY.
RADCLIFFE G. EDMONDS.